No. 649,744.  
T. G. NEAL.  
DETACHABLE COUPLING FOR VENT OR WASTE PIPES.  
(Application filed Aug. 16, 1899.)
Patented May 15, 1900.
(No Model.)
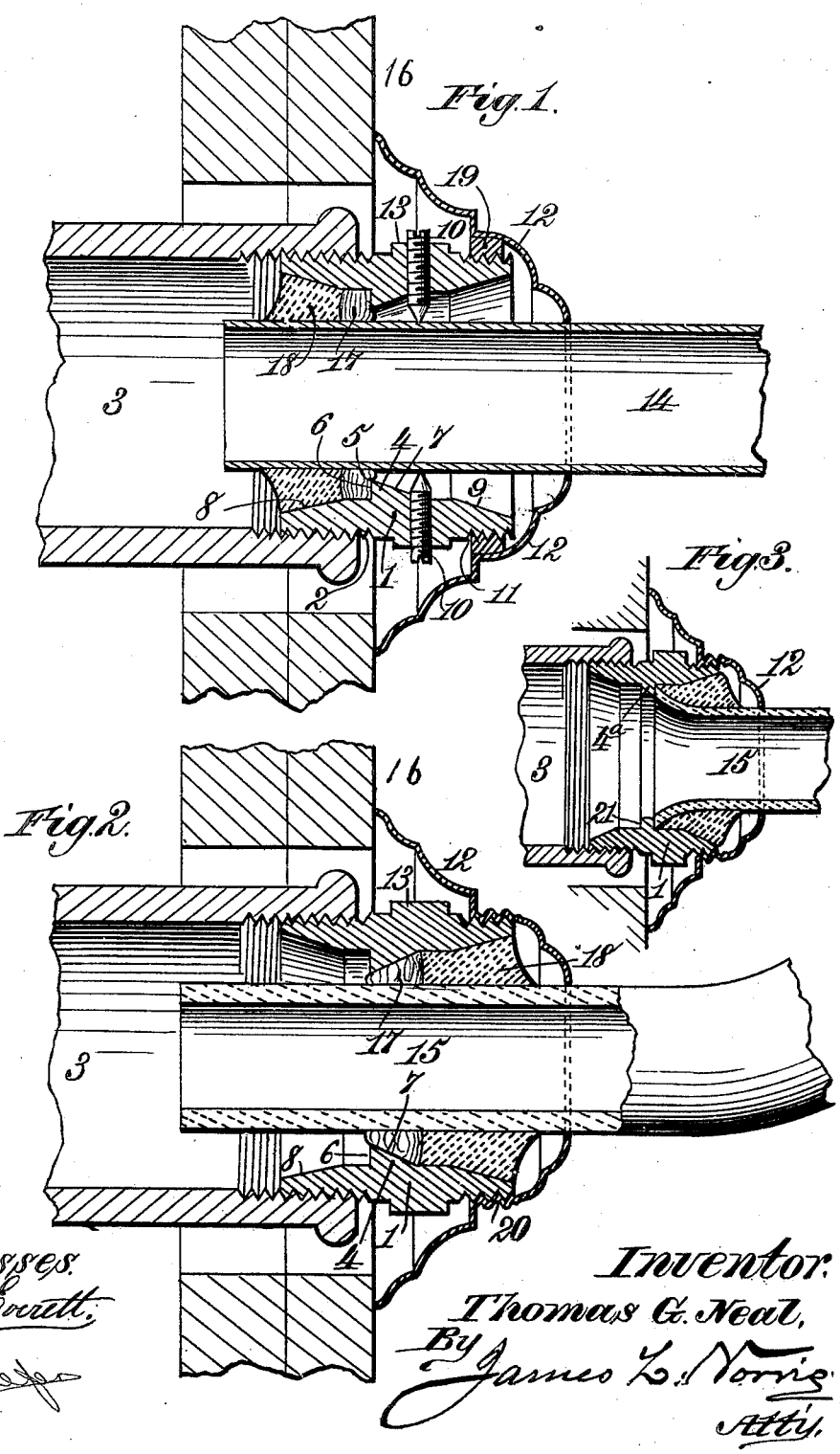
Witnesses.  
Robert Everett.  
H. B. Keefer.
Inventor.  
Thomas G. Neal,  
By James L. Norris  
Atty.

UNITED STATES PATENT OFFICE.

THOMAS G. NEAL, OF WARREN, PENNSYLVANIA.

DETACHABLE COUPLING FOR VENT OR WASTE PIPES.

SPECIFICATION forming part of Letters Patent No. 649,744, dated May 15, 1900.

Application filed August 16, 1899. Serial No. 727,459. (No model.)

*To all whom it may concern:*

Be it known that I, THOMAS G. NEAL, a subject of the Queen of Great Britain, (but having declared my intention to become a citizen of the United States,) residing at Warren, in the county of Warren and State of Pennsylvania, have invented new and useful Improvements in Detachable Couplings for Vent or Waste Pipes, of which the following is a specification.

This invention relates to detachable couplings for vent and waste pipes; and it has for one object to provide an improved coupling particularly designed for basins and closets, adapted for coupling either lead or hard-metal pipes to the vent and waste pipes and to accommodate pipes of varying sizes.

It has for a further object to provide a coupling of the character described that may be quickly and conveniently put in place with but little labor, that may be readily removed and replaced, and which when in place will present a neat and finished appearance.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a longitudinal vertical sectional view showing my coupling applied to a hard-metal pipe, and Fig. 2 is a similar view showing the same applied to a lead pipe. Fig. 3 is a similar view illustrating a slightly-modified form of coupling especially designed for use in connection with a lead pipe.

Heretofore in coupling the waste and vent pipes leading from basins and closet-bowls to the waste and vent pipes in the walls it has been a common expedient to connect said pipes by a wiped or soldered joint, to effect which is a difficult and tedious operation owing to the inaccessibility of the joints, and, furthermore, such a method of forming the joints is objectionable owing to the liability of the wainscoting or tiling being scorched or damaged in the operation. Furthermore, in those couplings heretofore commonly employed to do away with the necessity of wiping the joints after the parts have been set in place it has been found necessary to provide two different types or kinds of couplings, one being adapted for use in connection with lead pipes and another for hard-metal pipes.

My improved coupling is equally well adapted for use in connection with either lead or hard-metal pipes, can be employed to couple pipes of varying sizes, may be quickly and conveniently set up in place, and may also be quickly and easily detached without damaging or disturbing any of the parts.

Referring to the drawings, the numeral 1 indicates a sleeve or nipple threaded externally at one end, as at 2, to enable it to be screwed into the interiorly-threaded end of a vent or waste pipe 3, arranged in the wall of the building, as usual. Formed upon the interior of the sleeve 1 intermediate its ends is an annular inwardly-projecting flange 4, the inner edge of which forms a knife-edge 5. Said flange on its inner face is preferably straight or at a right angle to the sleeve, as at 6, while its opposite or outer face is beveled or inclined toward the sleeve, as at 7, for the purpose hereinafter made apparent. The interior or inner wall of the sleeve is cylindrical for a portion of its length on each side of the flange 4, and at its opposite ends is cone-shaped or beveled outwardly or made flaring, as at 8 and 9. Screwed through the outer cylindrical portion of the sleeve are a plurality of screws 10, preferably four in number, arranged ninety degrees apart. The outer end of the sleeve is externally threaded, as at 11, to receive the escutcheon 12, and has its exterior intermediate its ends constructed with seats, as at 13, adapted to be grasped by a wrench to enable the sleeve to be screwed into and out of the waste or vent pipe 3.

In Fig. 1 the numeral 14 indicates a hard-metal vent or waste pipe leading from a basin or a closet-bowl, and in Fig. 2 the numeral 15 indicates a similar pipe of lead. In both of said figures the numeral 16 indicates the wall, and 3 a section of the fixed waste or vent pipe, built into the wall, the end of said pipe being disposed flush with the inner finished face of the wall, as shown.

When the vent or waste pipe of the basin or bowl is of hard metal, the sleeve or nipple 1 is first screwed into the end of the fixed vent or waste pipe 3, and when the basin or bowl is set up in position the pipe 14 is inserted in the sleeve or nipple, after which the screws 10 are screwed in firmly against said pipe to hold it securely in place at the angle to which it is adjusted. The sleeve or nipple, with the pipe 14, is then removed from the pipe 3, when by holding the pipe 14 upright a packing 17, of asbestos, may be first tamped down between the pipe and sleeve and against the flange 4, after which solder is poured into the conical end 8 of the sleeve or nipple, as at 18, and finished off by wiping or with a soldering-iron. The sleeve or nipple is thus firmly attached to the pipe 14, holding the pipe immovably fixed in the sleeve at the angle to which it was originally set or adjusted and forming an absolutely water and gas tight joint between the two. The sleeve is finally screwed back into place in the pipe 3 and the pipe 14 connected up to the basin or bowl. The escutcheon 12, which has been previously slipped over the pipe 14, is then screwed over the threaded end 11 of the sleeve or nipple until its inner edge abuts the wall, thus concealing the joint and giving to the whole a finished and ornamental appearance. The escutcheon 12 is preferably formed of spun metal in the usual manner and may either have an interiorly-threaded metal annulus 19 soldered to its interior for engaging the threaded end 11 of the pipe, as indicated in Fig. 1, or the thread may be pressed or spun directly in the body of the escutcheon, as indicated at 20 in Fig. 2. The manner shown in both figures of drawing or screwing the escutcheon onto the end of the pipe is especially advantageous, as the escutcheon may be easily set up against the wall no matter how far the sleeve or nipple may be screwed into the pipe 3, and in case of shrinkage of the wall it may be quickly adjusted up against the latter.

If the vent or waste pipe attached to the basin or bowl be of lead, the method of setting up the parts in place is the same as that before described, excepting that it is not essential that the lead pipe be set at the angle to which it is fitted in the sleeve or nipple, as the pipe may be bent, after the parts have been fixed in place, to the angle desired. After the sleeve or nipple has been fitted on the lead pipe 15 the asbestos packing is inserted in the space between the sleeve and the pipe 15 and against the flange 4; but in this instance the packing is inserted in the outer end portion of the sleeve or nipple, and the solder is then poured into the conical end 9 of the sleeve or nipple and is wiped off or finished with a soldering-iron, as before, after which the escutcheon is screwed up into place in the manner before described. The flared or conical ends 3 and 9 of the sleeve or nipple are preferably tinned to facilitate the soldering operation.

The purpose of the asbestos packing is to prevent the solder from running between the flange 4 and the pipe.

The coupling can be employed in connection with any pipe, from the largest-sized pipe that may be inserted through the flange 4 to the smallest size. By making the flange of the shape shown the pipe, even the largest size, can be fitted in the sleeve or nipple at any desired angle within certain limits.

The coupling may be unscrewed at any time and the waste or vent pipe removed to remove scale and the like therefrom, after which the parts may be replaced without disturbing any of the fixtures or impairing the joint.

In Fig. 3 of the drawings I have shown a slightly-modified form of coupling especially designed for use in connection with a lead pipe. This coupling does not differ from that shown in Fig. 2 of the drawings, excepting that the inwardly-projecting flange 4ª instead of being beveled upon its inner edge, as before described, is formed with parallel opposite sides 21, and its inner edge is made square or at a right angle to the sides 21, as shown. The pipe 15 is not passed through the annular flange 4ª, as shown; but its end is seated against said flange and the solder poured between the lead pipe and the flange flaring end of the coupling, as before described. Lead pipes of varying diameters within certain limits may be fitted in the coupling, it being only necessary to expand or contract the end of the lead pipe to cause it to fit snugly to its seat in the conical end of the coupling.

Having described my invention, what I claim is—

1. The combination of a fixed vent or waste pipe internally screw-threaded at one end, and a coupling-sleeve formed with externally-screw-threaded extremities, internally-cone-shaped end portions and an annular, inwardly-projecting flange between said cone-shaped end portions, and designed to screw into said fixed pipe and receive a vent or waste pipe, packing therefor and an internally-screw-threaded escutcheon, substantially as and for the purposes described.

2. The combination of a fixed, internally-screw-threaded vent or waste pipe, a coupling-sleeve externally screw-threaded at its extremities, screwed into said fixed pipe, and formed internally with cone-shaped end portions and an annular, inwardly - projecting flange between said cone-shaped end portions, a vent or waste pipe inserted into said sleeves, a packing surrounding the inserted pipe and packed against one of the internal cone-shaped end portions thereof, and an internally - screw - threaded escutcheon screwed upon one of the externally-screw-threaded extremities of the sleeve, substantially as and for the purposes described.

3. A vent or waste pipe coupling comprising a sleeve provided upon its interior intermediate its ends with an annular flange having a beveled inner edge portion, and having flaring or conical ends, and a plurality of set-screws projecting through the sleeve between one end thereof and said flange, said set-screws being arranged at equal distances apart, substantially as and for the purpose specified.

4. A vent or waste pipe coupling comprising a sleeve provided with means for attaching the same to two sections of a vent or waste pipe and threaded externally at one end, and an internally-threaded escutcheon screwed over the threaded end of the sleeve and adapted to be adjusted thereon, substantially as described.

5. The combination with two sections of a vent or waste pipe, one of said sections being internally threaded, of a sleeve exteriorly threaded and screwed into said threaded section, said sleeve being provided intermediate its ends with an integral inwardly-projecting annular flange, the end of the other section being passed through said flange, a packing of asbestos seated between said section and sleeve and against the flange, and solder applied between the section and sleeve and over the asbestos packing, substantially as described.

In testimony whereof I have hereunto set my hand in presence of two subscribing witnesses.

THOMAS G. NEAL.

Witnesses:
O. P. BUSH,
H. F. BELL.